No. 635,664. Patented Oct. 24, 1899.
B. H. & N. R. COURSEY.
CYCLE BRAKE AND MOTOR.
(Application filed Jan. 28, 1899.)
(No Model.) 2 Sheets—Sheet 1.
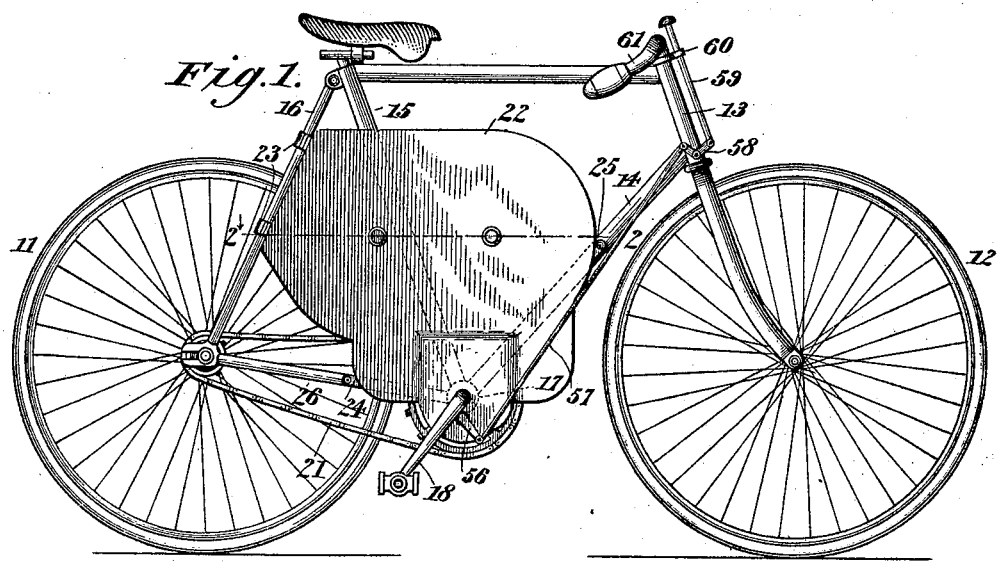
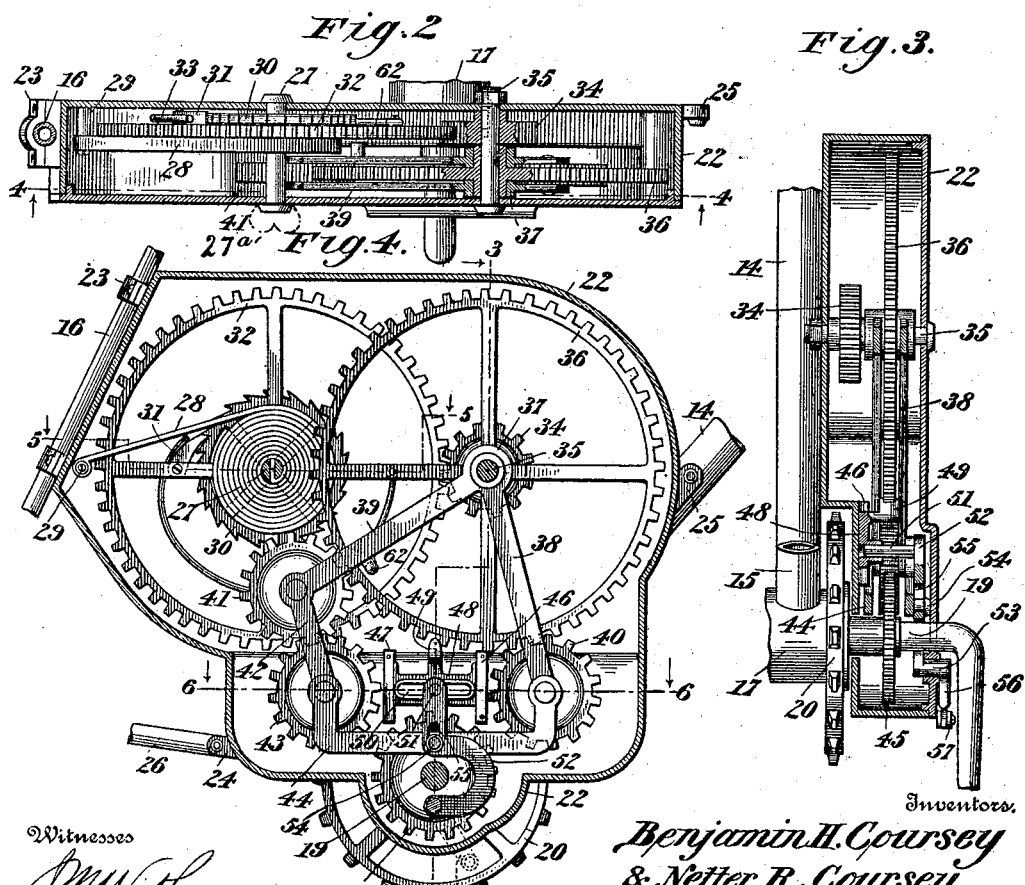

No. 635,664. Patented Oct. 24, 1899.
B. H. & N. R. COURSEY.
CYCLE BRAKE AND MOTOR.
(Application filed Jan. 28, 1899.)
(No Model.) 2 Sheets—Sheet 2.
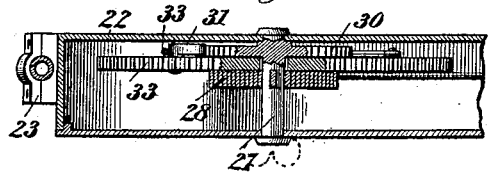
Fig. 5.
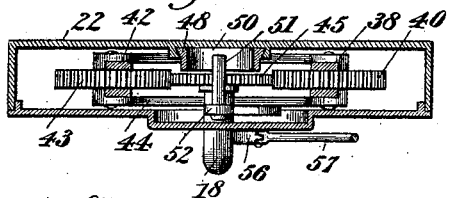
Fig. 6.
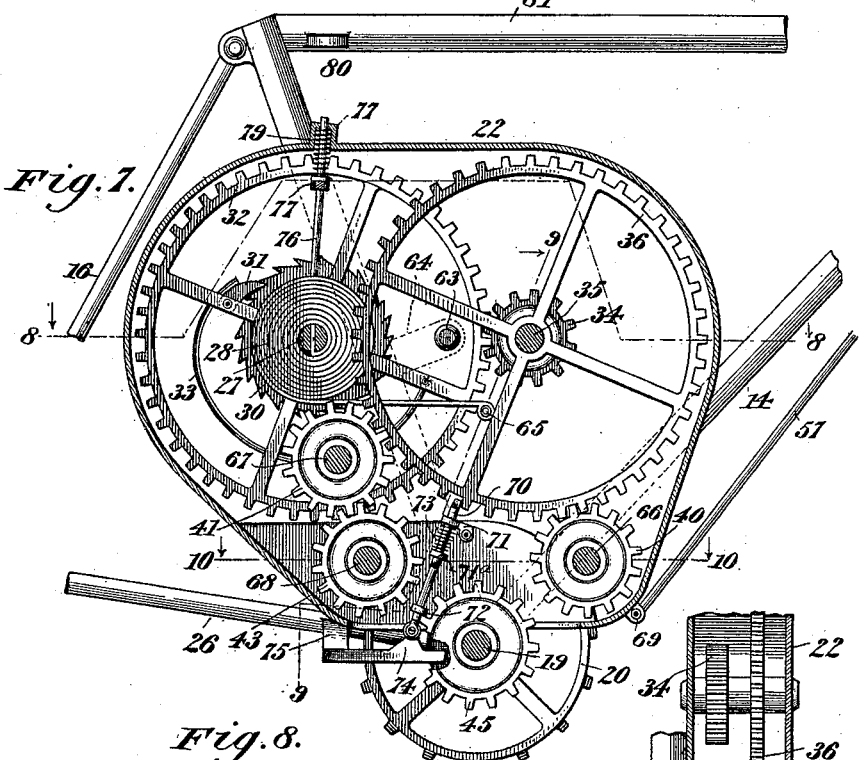
Fig. 7.
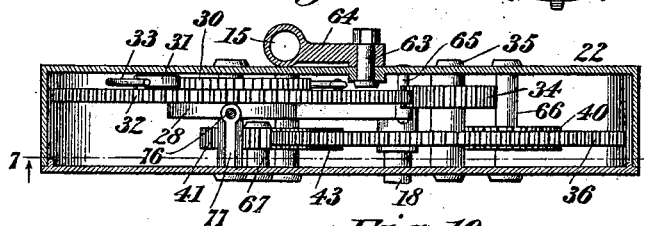
Fig. 8.
Fig. 9.
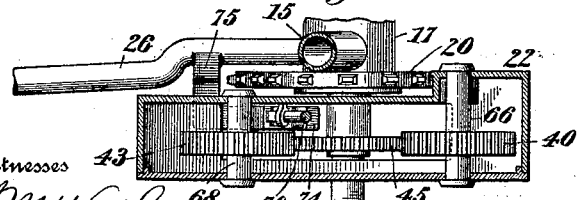
Fig. 10.
Witnesses
Inventors
Benjamin H. Coursey
& Netter R. Coursey,
by O'Meara & Co.
Attorneys
THE NORRIS PETERS CO., PHOTO-LITHO., WASHINGTON, D. C.

UNITED STATES PATENT OFFICE.

BENJAMIN H. COURSEY, OF SHARON GROVE, KENTUCKY, AND NETTER R. COURSEY, OF BLOSSOM, TEXAS.

CYCLE BRAKE AND MOTOR.

SPECIFICATION forming part of Letters Patent No. 635,664, dated October 24, 1899.

Application filed January 28, 1899. Serial No. 703,720. (No model.)

*To all whom it may concern:*

Be it known that we, BENJAMIN H. COURSEY, residing at Sharon Grove, in the county of Todd and State of Kentucky, and NETTER R. COURSEY, residing at Blossom, in the county of Lamar and State of Texas, citizens of the United States, have invented a new and useful Cycle Brake and Motor, of which the following is a specification.

This invention is in the nature of a motor for attachment to bicycles or like vehicles to be thrown into and out of gear with the ordinary driving mechanism and under certain circumstances to act as a brake for the vehicle.

The object of the invention is to provide a spring-motor which may be built with or afterward attached to a cycle the parts of which shall be arranged to be wound up by the operation of the ordinary driving mechanism when on a level or a downgrade and thrown into gear with said ordinary driving mechanism to assist in propelling the vehicle upgrade.

With this object in view the invention consists in the improved construction, arrangement, and combination of parts hereinafter fully described and afterward specifically pointed out in the claims.

In order to enable others skilled in the art to which the invention most nearly appertains to make and use the same, the construction and operation of the invention will now be described, reference being had to the accompanying drawings, forming part hereof, in which—

Figure 1 is a view in side elevation of a bicycle equipped with the invention. Fig. 2 is a horizontal sectional view on the broken line 2 2 of Fig. 1, looking downward. Fig. 3 is a transverse vertical sectional view on the broken line 3 3 of Fig. 4, looking to the right. Fig. 4 is a longitudinal vertical section on the broken line 4 4 of Fig. 2, looking in the direction of the arrows. Fig. 5 is a horizontal section on the broken line 5 5 of Fig. 4, looking downward. Fig. 6 is a horizontal section on the broken line 6 6 of Fig. 4, looking downward. Fig. 7 is a longitudinal vertical section on the broken line 7 7 of Fig. 8, illustrating the invention with a modified form of mechanism for throwing the motor into and out of gear with the ordinary driving mechanism of a bicycle. Fig. 8 is a sectional view on the broken line 8 8 of Fig. 7, looking downward. Fig. 9 is a sectional view on the broken line 9 9 of Fig. 7, looking to the right. Fig. 10 is a horizontal section on the broken line 10 10 of Fig. 7, looking downward.

Like numerals of reference indicate the same parts in all the figures of the drawings.

This invention is illustrated as applied to a bicycle, although it will be readily understood that it may be applied to any vehicle of a rolling or like character, and in the illustration here given 11 indicates the rear wheel; 12, the front wheel; 13, the steering-post; 14, the front brace; 15, the rear brace; 16, the rear forks; 17, the crank-hanger; 18, one of the crank-arms; 19, the crank-shaft; 20, the front sprocket-wheel on the crank-shaft 19, and 21 the drive-chain connecting it with the rear sprocket. All of these parts may be of any ordinary and well-known construction, variations in their construction having no effect whatever upon this invention.

Referring to the construction illustrated in Figs. 1 to 6, 22 indicates a casing rigidly secured to the frame of the machine by clamps 23, embracing the rear forks, and by bolts or rivets passing through lugs or ears 24 and 25 into the side bar 26 and the front brace 14 of the machine. The casing 22 is provided with two flat vertical sides, the outside being preferably made removable, and both sides of the casing are perforated for the passage of the crank-shaft 19 and to form bearings for the various shafts of the motor which is inclosed within the casing. 27 indicates a shaft having its bearings in the motor-casing, upon which is secured one end of a spring 28, which after being wound upon the shaft has its outer end secured at 29 to the casing. The shaft 27 has a crank or handle 27ª for winding the spring by hand. A ratchet-wheel 30 is secured upon the shaft 27, having its teeth arranged to coact with a pawl 31, pivoted to a gear-wheel 32, loosely mounted on the shaft 27, the pawl being normally kept in engagement with the teeth by means of a spring 33, also secured upon the gear-wheel 32. The gear-wheel 32 meshes with a pinion 34, rigidly secured upon the shaft 35, which has its bearings in the casing. A gear-wheel 36 is mounted upon the shaft 35 and frictionally secured thereto, so that it will ordinarily turn with the shaft, but by the exertion of extra force may be made to turn on the shaft. A hub or ring 37 is loosely pivoted on the projecting hub of the wheel 36 and carries two rigid arms 38 and 39, in the outer ends of which are journaled, respectively, pinions 40 and 41, both meshing with the wheel 36. A rigid branch 42 extends at an angle from the outer end of the arm 39, and in its outer end is journaled a pinion 43, the teeth of which are in engagement with those of the pinion 41. The journals of the pinions 40 and 43 are connected by a bar 44, which assists in maintaining them at a given distance apart. On the crank-shaft 19 is secured a gear-wheel 45, in the same vertical plane with the gear-wheel 36 and pinions 40, 41, and 43. Secured to the inside of the casing are metallic guideways 46 and 47, in which is mounted to slide vertically a plate or block 48, having a central upwardly-projecting tooth or finger 49, adapted when at the end of its upward movement to engage in the teeth of the gear-wheel 36. The block or plate 48 is provided with a horizontal slot 50, into which projects a horizontal pin 51, projecting inwardly from a lever 52, pivotally secured by means of the bend 53 in the casing 22 in a direct line below the crank-shaft 19. By means of a pin 54, projecting from the bar 44 through a vertical slot 55 in the lever 52, the said lever and bar are loosely connected together. The lever 52 projects outside of the casing in the form of a crank-arm 56, to which is secured a connecting-rod 57, which at its opposite end is secured to one arm of an elbow-lever 58, pivoted to steering-post 13, the other arm of the elbow-lever being pivotally connected to a bar 59, mounted to slide in a clip 60 in front of the steering-post and convenient to the handle-bars 61. The arms 38 and 39 are duplicated on the opposite sides of the wheel 36, and from the rear arm 39 projects a stop 62 in the vertical plane of the spring 28, the use of which will be hereinafter explained.

In the operation of this invention when it is desired to wind up the spring 28 the bar 59 is raised, which, through the medium of the elbow-lever 58, connecting-rod 57, crank-arms 56, and lever 52, will throw the bar 44 to the right and bring the pinion 43 into engagement with the pinion 45 on the crank-shaft 19. This with the pinion 45 rotating in a forward direction will cause the pinion 43 to rotate backward, the pinion 41 to rotate forward, the gear-wheel and pinion 36 and 34 to rotate backward, and the gear-wheel 32 to rotate forward or in a direction to cause the pawl 31 to engage in the teeth of the ratchet-wheel 30 and turn the shaft 27, thus winding up the spring. During this movement of the lever 52 on its pivot 53 the pin 51, moving in the slot 50 of the block or plate 48, will cause said block to be slid downward in the ways 46 and 47, withdrawing its finger 49 from engagement with the teeth of the gear-wheel 36, said finger 49 being held in engagement with the teeth of the wheel 36 at all times when both pinions 40 and 43 are disengaged from pinion 45 on the crank-shaft and preventing the motor from running and the spring unwinding. The spring having been wound up in the manner described by the motion of the vehicle, further motion of the vehicle will simply cause the gear-wheel 36 to turn on its shaft and act as a brake without injury to the machine by the sudden stoppage which would be necessary if the wheel 36 were rigidly fixed upon its shaft. The operation of winding the spring, as hereinbefore described, having been performed in riding upon a level or descending a hill, and it being desired at the foot of an ascent to bring the spring into play to assist in carrying the vehicle up the ascent, the rod 59 will be depressed, which, through the medium of the connections before mentioned, will cause the bar 44 to be thrown to the left, bringing the pinion 40 into engagement with the pinion 45 on the crank-shaft. The force of the spring in its endeavor to unwind itself will now be exerted through the medium of the teeth of the ratchet-wheel 30 upon the point of the pawl 31, which will cause the gear-wheel 32 to be rotated to the left, the pinion 34 and gear-wheel 36 to the right, the pinion 40 to the left, and the pinion 45 to the right or forward with the crank-shaft, thus assisting the rider in propelling the vehicle. In unwinding the motor-spring will expand principally in the direction opposite to the point of attachment to its outer end or the point of outer resistance. In this expansion the coils of the spring will come in contact with the stop 62, before described, and will press outward and downward against the arm 39, to which the stop 62 is secured. This will cause the arm 39 to move downward on its pivot and force the bar 44 to the right, bringing the pinion 43 into engagement with the pinion 45 and automatically throwing the motor out of gear and in position so that one motion of the lever-rod will cause the spring to be again wound up by the propulsion of the vehicle. By means of this arrangement the spring may be always kept wound ready to be thrown into operation when a hill is encountered, and by adjusting the bar 59 in its middle position the finger 49 will assume the position shown in Fig. 4 and prevent the spring from unwinding again until the proper adjustment of the motor is made through the medium of the bar 59. When the parts are adjusted as shown in Fig. 4, the wheel is driven by the ordinary pedal-crank and sprocket-wheels without any interference whatever on the part of the motor or brake.

In the construction illustrated in Figs. 7 to 10, inclusive, the same number of gear-wheels, shafts, and pinions are used in the same relation as in the construction illustrated in Figs. 1 to 6, inclusive, and hereinbefore described. In the modified construction, however, the casing 22 is not rigidly attached to the frame, but is pivoted upon a pin 63, secured in a bracket 64, formed upon the rear brace 15 or secured thereto in any suitable manner. The shaft 27 is journaled in the casing, the inner end of the spring 28 secured thereto, and its outer end secured at 65 to the casing instead of at 29, as in the former construction, the ratchet-wheel 30 being secured upon the shaft 27 in the same relation as before described. The pawl 31, engaging the ratchet-wheel, is pivoted to the gear-wheel 32 and held in contact by the spring 33, secured to the gear-wheel 32, and the gear-wheel 32 is loosely mounted upon the shaft 27. The shaft 35 is likewise journaled in the casing 22 and has rigidly fixed to it the same pinion 34 which meshes with the gear-wheel 32, and the wheel 36 is frictionally mounted upon the shaft 35 and is normally in mesh with the pinions 40 and 41, which in this instance are mounted, respectively, on the shaft 66, journaled in the the frame, and a stub-shaft 67, journaled in one side of the frame. In proper position to remain continuously in mesh with the pinion 41, the pinion 43 is mounted upon a shaft 68, journaled in the casing. All of the shafts, pinions, and gear-wheels just described are fixed with relation to each other as to position; but the whole frame pivoted upon the pin 63 is adapted to swing forward or backward or to the right or left, as illustrated in Fig. 7, in order to bring either the pinion 43 or pinion 41 into engagement with the pinion 45 on the crank-shaft 19. This swinging adjustment is made in substantially the same manner as in the construction before described, the connecting-rod 57 being pivoted at 69 to the casing instead of to the crank-arm 56, as in the other construction, the elbow-lever 58 and operating-bar 59 being used in this construction also in the same manner as before described. By swinging the frame to the right, as in Fig. 4, the pinion 43 is brought into engagement with the pinion 45 on the crank-shaft, and the spring is wound by the movement of the machine. The reverse motion of the casing to the left brings the pinion 40 into mesh with the pinion 45 on the crank-shaft, in which adjustment the force of the spring will be expended in assisting in the propulsion of the vehicle. 70 indicates a bar mounted to slide in suitable brackets 71 and 72, projecting inwardly from one side of the casing, a spring 73, having one end bearing against the bracket 71 and the other end against a collar 71ª on the bar 70, serving to normally press the bar downward and outward, whereby a roller on its outer end will be held normally in contact with the cam 74, which forms part of a bracket 75, secured to the side bar 26 of the frame of the machine.

When the parts are in their inoperative position, as illustrated in Fig. 7, in which neither of the pinions 40 or 43 are in mesh with the pinion 45, the roller on the outer end of the bar 70 will engage a depression in the central or highest point of the cam 74 and be pressed into engagement thereby with the teeth of the wheel 36, thereby preventing said wheel from rotating and the spring from running down or unwinding. When, however, the casing is moved in either direction, the roller on the bar 70 will ride down one of the inclines at the sides of the cam 74 and permit the spring 73 to press the bar outward out of engagement with the teeth of the wheel 36, so that it will form no impediment to the winding of the spring nor the operation of the motor in assisting in the propulsion of the vehicle.

76 indicates a bar adapted to slide in an extension 77 of the casing 22, having its inner end bearing upon the outer coil of the motor-spring 28 and normally held pressed against the spring by means of a spring 79, rigidly secured to the bar and bearing at its outer end against the extension 77 of the casing. As the spring 28 unwinds in assisting in the propulsion of the vehicle the bar 76 is pressed outward until its outer end comes in contact with the stop 80 on the top bar 81 of the frame of the bicycle, when the further expansion or unwinding of the spring will cause the casing 22 to be swung on the pin 63 toward the right, and thus throw the machine out of gear and into position, so that the motion of the lever will bring the pinion 42 into engagement with the pinion 45 on the crank-shaft and cause the spring to be wound up by the further propulsion of the vehicle, the casing being held in such adjusted position by the contact of the roller on the outer end of the bar 70 with the left-hand incline of the cam 74.

From the foregoing description of the construction and operation of this invention it will be seen that the invention includes a motor which may be utilized in assisting in the ascent of an incline, means whereby the motor-spring is wound up by the propulsion of the vehicle, preferably upon a level or descending grade, means whereby the motor will perform the function of a brake while the spring is being wound as well as after it is entirely wound up, and means whereby the mechanism for winding the motor-spring may be, if desired, thrown into engagement as soon as the spring is unwound by the unwinding of the spring itself.

It will be specially noted that one motion of the lever-rod throws the mechanism into gear for winding and that the opposite motion of the same lever-rod throws the mechanism into position for unwinding. The motor-spring in unwinding automatically throws the machine out of gear, and by having the slight notch or depression at the top center of the cam 74 the mechanism is temporarily stopped and held out of gear; but this depression is not sufficiently deep to interfere with the action of the lever-rod when it is wanted to throw the mechanism into gear.

The crank or handle 27ª is a great advantage, as it enables one to wind the spring by hand, which may be necessary occasionally when the spring has run down and spent its force before the top of a hill has been reached.

The advantages of this invention will be obvious to all skilled in the art to which it appertains. The power developed by the mechanism itself in descending a grade may be utilized to store up power to assist in mounting ascending grades, and the construction of the mechanism is such that there is very little liability of breakage or displacement with ordinary usage. The arrangement of the mechanism is also such that the motor itself will act as a brake after the spring is entirely wound up, thereby avoiding a sudden stoppage and almost certain breakage therefrom when the spring becomes tightly wound.

While the best means in our knowledge at this time for carrying out our invention have been illustrated and described herein, it will be obvious to persons familiar with this class of vehicles that many of the parts might be slightly changed by the exercise of mere mechanical skill or substitution. We therefore hold that such slight changes or variations in the construction of the parts of the invention would be clearly included within the limit and scope thereof.

Having thus fully described the invention, what we claim as new, and desire to secure by Letters Patent of the United States, is—

1. In a bicycle or like vehicle, the combination with the crank-shaft and a pinion thereon, of a spring-motor inclosed in a casing secured to the frame of the vehicle, including two gears rotated by the motor in opposite directions, a stop mechanism engaging the teeth of the gear-wheel in the motor when both pinions are out of engagement with the pinion on the crank-shaft, a rod in close proximity to the handle-bars, and means for simultaneously causing the engagement of one of the motor-pinions with the crank-shaft pinion and the disengagement of the stop-finger from the gear-wheel of the motor, substantially as described.

2. In a bicycle or like vehicle, the combination with the crank-shaft and a pinion secured thereon, of the motor-spring shaft, a train of gearing adapted to be engaged with the crank-shaft pinion, whereby the rotation of the crank-shaft will wind the spring-motor, and mechanism actuated by the unwinding of the spring to throw said train of mechanism into position for engagement with the crank-shaft pinion, substantially as described.

3. In a bicycle or like vehicle, the combination with the crank-shaft and a pinion secured thereon, of a spring-motor attached to the frame of the machine, two pinions, forming part of the motor, located above and on opposite sides of the crank-shaft pinion and driven in opposite directions by the motor-spring, a bar connecting the journals of these pinions to each other and maintaining them at a proper distance apart, and means for swinging both pinions in either direction to bring either into engagement with the crank-shaft pinion, substantially as described.

4. In a bicycle or like vehicle, the combination with the crank-shaft and the pinion thereon, of a casing attached to the frame of the machine, a shaft journaled in the casing, a spring having its inner end secured to the shaft and its outer end to the casing, a ratchet-wheel secured to the shaft, a gear-wheel loose on the shaft, a spring-operated pawl pivoted to the gear-wheel and engaging the teeth of the ratchet-wheel, a second shaft journaled in the casing, a pinion rigidly secured to said shaft and engaging with the gear-wheel on the spring-shaft, a gear-wheel frictionally secured on the second shaft, a pinion engaging the last-mentioned gear-wheel, and a pinion engaging the last-named pinion and adapted to be brought into engagement with the crank-shaft pinion when desired, substantially as described.

5. In a bicycle or like vehicle, the combination with the crank-shaft and a pinion thereon, of a motor carried in a casing pivotally connected to the frame of the machine, two pinions journaled in the casing adjacent to the crank-shaft pinion, and rotated by the motor in opposite directions, and means for swinging the motor-casing on its pivot to bring either of these pinions into engagement with the crank-shaft pinion, substantially as described.

6. In a bicycle or like vehicle, the combination with the crank-shaft having a pinion thereon, of a motor carried in a casing pivotally connected to the frame of the machine, two pinions journaled in the casing adjacent to the crank-shaft pinion, and rotated by the motor in opposite directions, means for swinging the motor-casing on its pivot to bring either of these pinions into engagement with the crank-shaft pinion, a cam having inclinations in opposite directions secured to the frame of the machine, and an outwardly spring-pressed bar provided with a friction-roll in its outer end and operating in contact with said cam, substantially as described.

7. In a bicycle or like vehicle, the combination with the crank-shaft having a pinion thereon, of a motor carried in a casing pivotally connected to the frame of the machine, two pinions journaled in the casing adjacent to the crank-shaft pinion and rotated by the motor in opposite directions, means for swinging the motor-casing on its pivot to bring either of these pinions into engagement with the crank-shaft pinion, a cam having inclinations in opposite directions secured to the frame of the machine, an outwardly, spring-pressed bar provided with a friction-roll in its outer end operating in contact with said cam, an inwardly-spring-pressed bar mounted in the casing and bearing at its inner end against the outer coil of the spring-motor, and a stop on the frame of the machine against which said bar is actuated by the unwinding of the spring, substantially as described.

BENJAMIN H. COURSEY.
NETTER R. COURSEY.

Witnesses to signature of Benjamin H. Coursey:
 W. B. REEVES, Jr.,
 BEN. S. STREET.

Witnesses to signature of Netter R. Coursey:
 J. D. HAYDEN,
 W. L. WILLIAMS.